United States Patent
Kloefer et al.

(10) Patent No.: US 6,549,174 B2
(45) Date of Patent: Apr. 15, 2003

(54) APPARATUS FOR TRANSMITTING RADIO-FREQUENCY SIGNALS

(75) Inventors: Peter Kloefer, Steinen (DE); Bogdan Cherek, Peterborough (CA)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/905,183

(22) Filed: Jul. 16, 2001

(65) Prior Publication Data

US 2002/0080080 A1 Jun. 27, 2002

(30) Foreign Application Priority Data

Dec. 22, 2000 (DE) .......................... 100 64 812

(51) Int. Cl.[7] .............................................. H01Q 13/00
(52) U.S. Cl. ..................... 343/786; 343/785; 343/771
(58) Field of Search ............................. 343/771, 785, 343/786, 715, 840; 333/21 R

(56) References Cited

U.S. PATENT DOCUMENTS

| 4,053,894 | A | * | 10/1977 | Beckmann ................ 340/825 |
| 4,744,040 | A | | 5/1988 | Kawata et al. ............. 364/561 |
| 5,066,958 | A | | 11/1991 | Blachley ................... 343/786 |
| 5,245,353 | A | | 9/1993 | Gould ....................... 343/786 |
| 5,255,003 | A | | 10/1993 | Mitchell et al. ........... 343/786 |
| 5,331,332 | A | | 7/1994 | West et al. ................ 343/786 |
| 5,463,358 | A | | 10/1995 | Dunn et al. ................... 333/1 |
| 5,550,553 | A | * | 8/1996 | Yamaki et al. ............ 333/24.3 |
| 6,088,001 | A | * | 7/2000 | Burger et al. ............. 333/21 A |
| 6,353,417 | B1 | * | 3/2002 | Yuanzhu .................... 343/772 |
| 6,353,418 | B1 | * | 3/2002 | Burger et al. ............. 333/21 A |

FOREIGN PATENT DOCUMENTS

| DE | 9312251.9 | 12/1993 |
| DE | 9312251.9 | 1/1994 |
| DE | 19723880 A1 | 12/1998 |
| DE | 19800306 A1 | 7/1999 |
| DE | 19944103 A1 | 3/2001 |
| DE | 10023497 A1 | 11/2001 |
| EP | 0821431 A2 | 1/1998 |
| EP | 0922942 A1 | 6/1999 |
| EP | 0947812 A1 | 10/1999 |

* cited by examiner

*Primary Examiner*—Tan Ho
(74) *Attorney, Agent, or Firm*—Jones, Tullar & Cooper, P.C.

(57) ABSTRACT

The invention relates to an apparatus for transmitting radio-frequency signals using a signal generation unit (2), a signal line (3), a radiating element (4) and a waveguide (5) which is terminated in an end region by a back wall (6), where the signal generation unit (2) generates the radio-frequency signals, where the signal line (3) routes the radio-frequency signals to the radiating element (4), and where the radiating element (4) projects into the waveguide (5). The object is achieved by virtue of the radiating element (4) being arranged at an angle to the back wall (6) of the waveguide (5) or to a plane of the waveguide (5) which is parallel to the back wall (6).

18 Claims, 3 Drawing Sheets

6 GHz (mid-frequency)

APPARATUS FOR TRANSMITTING RADIO-FREQUENCY SIGNALS

BACKGROUND OF THE INVENTION

1. Field of the Invention

The invention relates to an apparatus for transmitting radio-frequency signals using a signal generation unit, a signal line, a radiating element and a waveguide which is terminated in an end region by a back wall, where the signal generation unit generates the radio-frequency signals, where the signal line routes the radio-frequency signals to the radiating element of the waveguide, and where the radiating element projects into the waveguide.

2. Discussion of Related Art

An apparatus of the type described above is used, for example, in instruments which determine the level of a filled product in a container using the delay time of radio-frequency measurement signals. Pulse timing methods utilize the physical conformity to law according to which the distance covered is equal to the product of delay time and propagation speed. In the case of level measurement, the distance covered is equivalent to twice the distance between antenna and surface of the filled product. The useful echo signal, that is to say the signal reflected at the surface of the filled product, and the delay time thereof are determined using the 'echo function' or using the digitized envelope, the envelope representing the amplitudes of the echo signals as a function of the distance 'antenna—surface of the filled product'. The level itself is then found from the difference between the known distance from the antenna to the bottom of the container and the distance from the surface of the filled product to the antenna which is determined by the measurement.

Customary methods for determining distance using the delay time of electromagnetic signals are the pulse radar method and he frequency modulation continuous wave method (FMCW method). In the case of the pulse radar method, short microwave pulses are transmitted cyclically. In the case of the FMCW method, a continuous microwave is Transmitted which is cyclically subjected to linear frequency modulation, for example on the basis of a sawtooth function. The frequency difference between the frequency of the received echo signal and the frequency of the transmitted signal at the instant of reception is dependent on the delay time of the echo signal. The frequency difference between transmitted signal and received signal, which difference can be obtained by mixing the two signals and evaluating the Fourier spectrum of the mixed signal, thus corresponds to the distance between the reflector, e.g. the surface of the filled product, and the antenna. In addition, the amplitudes of the spectral lines of the frequency spectrum obtained by Fourier transformation correspond to the echo amplitudes, which means that the Fourier spectrum represents the echo function.

The propagation of the radio-frequency measurement signals in the signal line and in the waveguide conforms to the physical laws of the propagation of electromagnetic waves. Normally, the signal line is a coaxial line. An input element is used to route the radio-frequency measurement signals from the inner conductor of the coaxial cable to the radiating element of the waveguide. The waveguide is either in the form of a square waveguide or is in the form of a round waveguide, with antennas having a circular cross section preferably being used in the field of level measurement, since they are better suited to being fitted into the nozzle of a container (tank, silo etc.), for example, than waveguides having a square cross section.

In a coaxial line, the transverse electromagnetic mode (TEM mode) ideally propagates without dispersion. This TEM mode is therefore particularly well suited to transporting wave packets or electromagnetic waves having a certain bandwidth. Wave packets which propagate in the TEM mode therefore encounter no spreading; similarly, microwaves frequency modulated on a linear basis largely prevent any discrepancy in linearity.

For the directional transmission of electromagnetic waves using an antenna, a mode is preferably used whose radiation characteristic has a pronounced forward lobe. This is a property of the transverse electric fundamental mode capable of propagation in round waveguides, the $TE_{11}$ mode. In a square waveguide, the corresponding fundamental mode is the $TE_{10}$ mode. Depending on the dimensions of the antenna in waveguide form, there is a respective defined frequency range in which exclusively this fundamental mode is capable of propagation. Above this frequency range, higher modes less well suited to directional transmission of microwaves propagate as well, for example the $TM_{01}$ mode in the case of the round waveguide and the $TE_{20}$ mode in the case of the square waveguide. While the range of unambiguity, that is to say the range in which only the fundamental mode is capable of propagation, is relatively large for a square waveguide, the range of unambiguity in the case of a round waveguide has relatively narrow proportions. The likelihood of undesirable higher modes also being prompted in addition to the fundamental mode when broadband signals are input is therefore much greater in the case of a round waveguide than in the case of a square waveguide. One undesirable consequence of different modes developing is 'ringing'. Ringing is caused by virtue of the fact that the individual modes capable of propagation in a waveguide have different propagation speeds. This is manifested in that the transmitted pulse does not disappear abruptly, but rather loses amplitude slowly. This ringing edge can cover the echo signal in the measurement range or can have the echo signal superimposed on it such that relatively large errors may arise when determining the measured value.

As an aside, examples of level-measuring instruments which have been disclosed to date are described in EP 0 821 431 A2 and in DE-GM 93 12 251.9. While EP 0 821 431 A2 describes an embodiment in which the radiating element, the 'transmission wire', is routed through the back wall into the interior of the waveguide, in DE-GM 93 12 251.9, the radio-frequency measurement signals are input onto the waveguide through the side wall.

SUMMARY OF THE INVENTION

The invention is based on the object of proposing an apparatus for transmitting radio-frequency measurement signals which is distinguished by an optimized radiation characteristic.

The object is achieved by virtue of the radiating element being arranged at an angle to the back wall of the waveguide or to a plane of the waveguide which is parallel to the back wall.

Known solutions always assumed that the radiating element, that is to say the exciter pin, needs to be arranged parallel to the back wall of the waveguide for optimum E field input.

Surprisingly, however, it has been found that much better results can be achieved when the exciter pin does not run parallel to the back wall, but rather at a certain angle to the back wall or to a plane which is parallel to the back wall. This angle depends on the rest of the input geometry and cannot be defined generally. It has been found—as already mentioned—that the exciter pin's being at an angle produces the stimulus in a very much more single-mode fashion, i.e. in essence only the desired mode, that is to say the fundamental mode, is prompted. This single-mode input can also be achieved even when measurement signals with a very broad bandwidth are input onto the waveguide. In addition, the apparatus according to the invention achieves very good matching between the signal line and the input element. As a result of the two effects, the ringing already described previously is drastically reduced, particularly when broadband measurement signals are input. In addition, suppression of the undesired higher modes achieves the desired radiation response with a pronounced directional characteristic in the direction of radiation.

In accordance with a first refinement of the apparatus according to the invention, the radiating element is routed through the back wall of the waveguide. In an alternative embodiment of the apparatus according to the invention, the radiating element is routed through the side wall of the waveguide.

In accordance with one advantageous development of the apparatus according to the invention, the size of the angle between the radiating element and the back wall of the waveguide or a plane parallel to the back wall of the waveguide is greater than 4°.

The radiating element may be a transmission wire, for example. In this case, a transmission head is preferably arranged in the region of the free end of the transmission wire. Alternatively, the radiating element used may be a conductor structure which is arranged on a printed circuit board, the radiating structure being arranged on the printed circuit board at an angle to the back wall of the waveguide or to a plane which is parallel o the back wall of the waveguide.

In accordance with one advantageous refinement of the apparatus according to the invention, the waveguide is routed to a horn, rod or parabolic antenna. This also allows the radiation characteristic of the apparatus to be optimized.

To protect the radiating element from deposits, one advantageous embodiment of the apparatus according to the invention provides for a dielectric material to fill up at least the interior of the waveguide in the region of the transmission wire. In particular, it is proposed in this context that the dielectric material contain a recess into which the transmission wire projects. The dielectric material is polytetrafluoroethylene (PTFE) or aluminum trioxide ($Al_2O_3$), for example.

As already mentioned previously, the apparatus according to the invention is preferably part of a level-measuring instrument. However, use of the apparatus according to the invention is in no way limited to this use. In principle, the apparatus can be used in any apparatuses which use radio-frequency measurement signals.

BRIEF DESCRIPTION OF THE DRAWINGS

The invention is explained in more detail with reference to the drawings below, in which.

DESCRIPTION OF THE PREFERRED EMBODIMENTS

Figure 1:
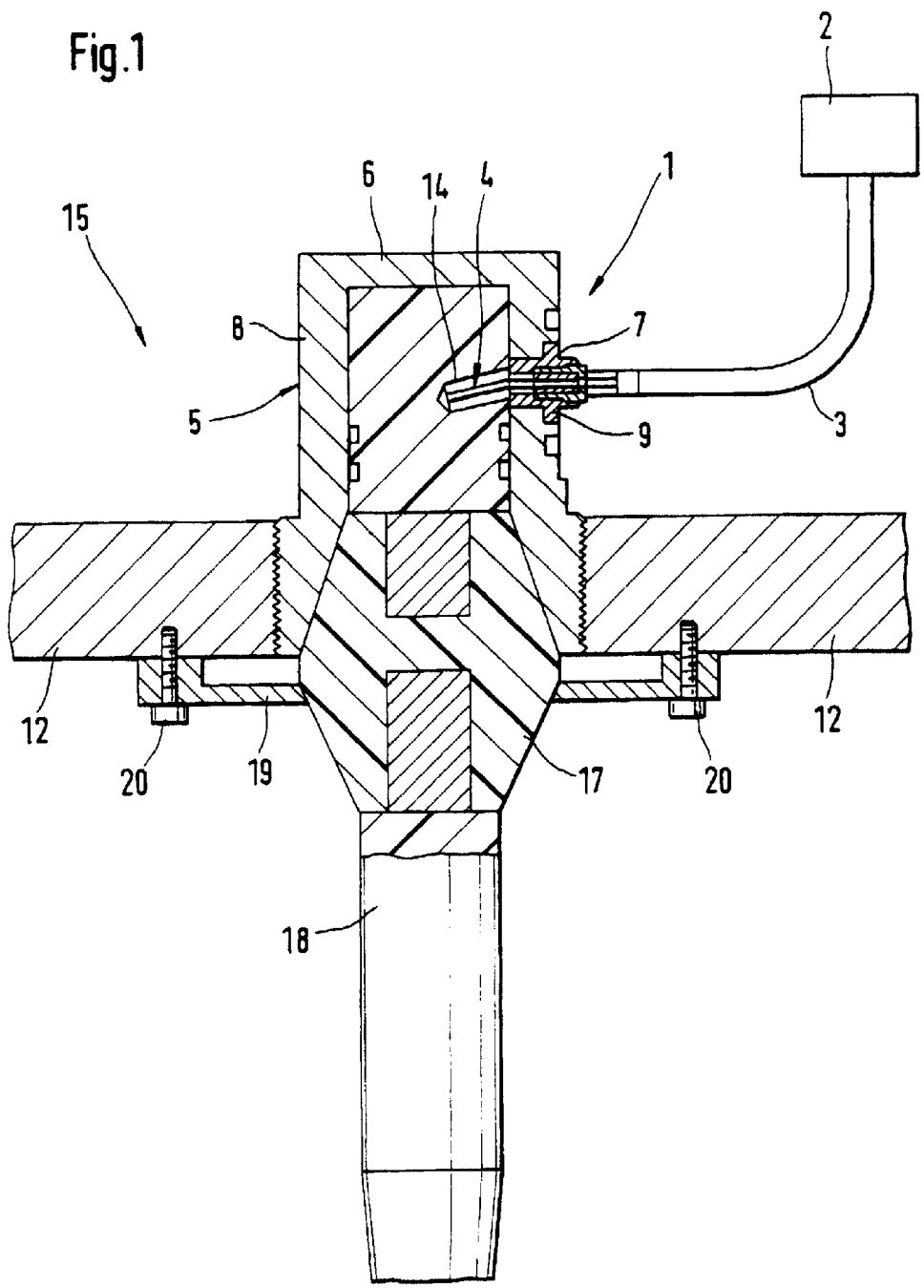
FIG. 1 shows a schematic illustration of a first application of the apparatus according to the invention.

FIG. 1 shows a schematic illustration of the inventive apparatus I integrated into a rod antenna 15. The inventive apparatus I comprises a signal generation unit 2, a signal line 3 and a radiating element 4 arranged in a waveguide 5, in this case a round waveguide. In the case shown, the radiating element 4 is a transmission wire. According to the invention, the radiating element 4 does not run parallel to the back wall 6 of the waveguide 5 or to a plane which is parallel to the back wall 6 of the waveguide 5, but instead is arranged at a certain angle to the back wall 6 or to the plane which is parallel to the back wall 6.

The signal generation unit 2 generates radio-frequency measurement signals and inputs them onto the radiating element 4 via the signal line 3, which is normally a coaxial cable. The rod antenna 15, via which the radio-frequency measurement signals are radiated and via which the reflected echo signals are received, comprises a round waveguide 5 in the case shown. The interior of the round waveguide 5 has an end region of the rod-shaped dielectric material 18 positioned in it. The side wall 8 of the round waveguide 5 contains an opening 7 in which a bushing 9 is locked, the bushing 9 being used to route the measurement signals from the signal line 3 to the radiating element 4. The radiating element 4 is arranged in a corresponding recess 14 in the dielectric material 18 of rod-shaped design.

A junction element 17, which is likewise made of a dielectric material, is mounted on a flange 12 by means of a flange 19 and mounting pins 20 and is simultaneously used for matching and for fixing the rod-shaped dielectric material 18 in the round waveguide 5.

Figure 2:
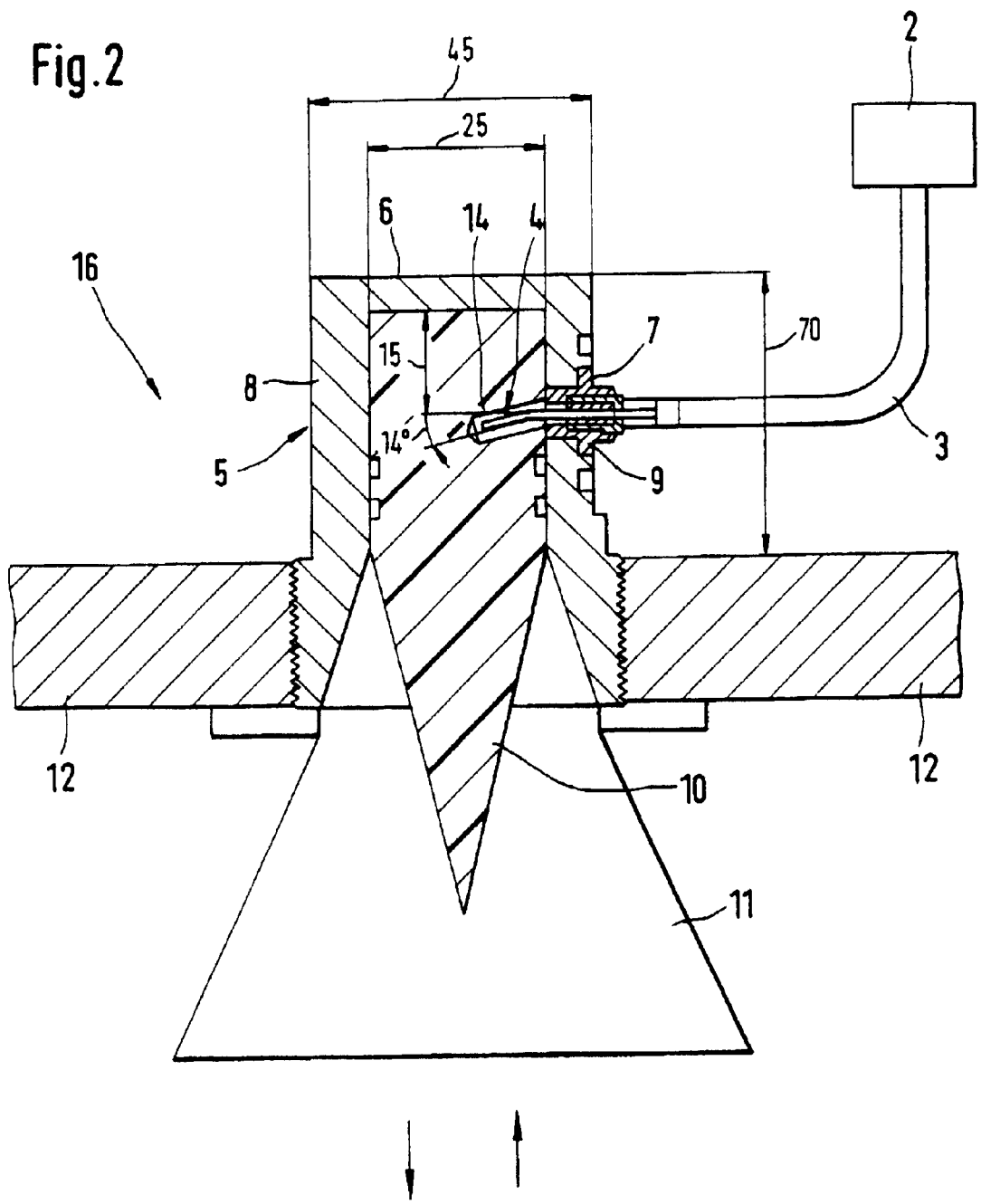
FIG. 2 shows a schematic illustration of a second application of the apparatus according to the invention.

FIG. 2 shows a schematic illustration of the inventive apparatus 1 integrated in a horn antenna 16. Whereas the radiation characteristic is optimized by the rod-shaped dielectric material 18 in the case of the rod antenna 15 shown in FIG. 1, optimization in the case of the horn antenna 16 is supported by a horn-shaped element 11 connected to the free end of the waveguide 5 in the direction of radiation. The directional characteristic of the horn antenna 16 is also improved by means of the dielectric material 10 which is placed in the waveguide 5 and, in addition, is tapered in the direction of radiation.

Figure 3:
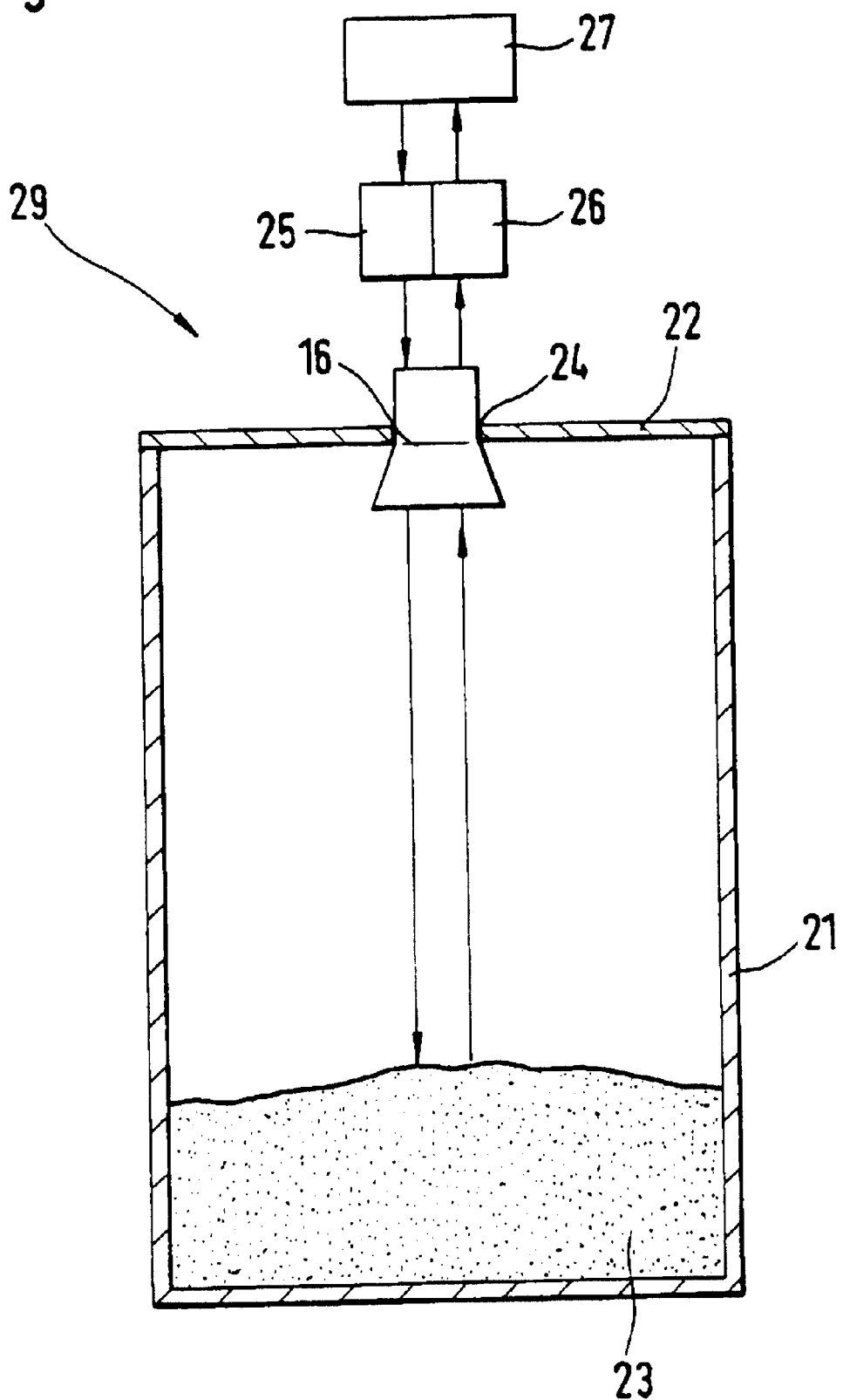
FIG. 3 shows a schematic illustration of a level-measuring instrument according to the invention.

FIG. 3 shows a schematic illustration of an inventive level-measuring instrument 29 mounted in an opening 24 of a cover 22 of a container 21. The level-measuring instrument 29 is a horn antenna 16 in which the apparatus 1 according to the invention is used. To determine the level of the filled product 23 in the container 21, radio-frequency measurement signals generated by the transmission unit 25 are transmitted via the home antenna 16 in the direction of the surface of the filled product 23. The echo signals reflected at the surface of the filled product 23 are detected by the reception unit 26. The control/evaluation unit uses the delay time difference between the measurement signals and the echo signals to determine the level of the filled product 23 in the container 21.

What is claimed is:

1. An apparatus for transmitting radio-frequency signals, comprising:
   a signal generating unit;
   a radiating element;
   a signal line connecting said signal generation unit to said radiating element; and a waveguide defining a side wall and a back wall, wherein:
  said radiating element projects through said side wall and into said waveguide oriented at an angle to said back wall, or to a plane parallel to said back all; and
  said signal generation unit generates radio-frequency signals which are routed by said signal line to said radiating element.

2. The apparatus as defined in claim 1, further wherein:
said angle is greater than 4°.

3. The apparatus as defined in claim 1, further wherein:
said radiating element is a transmission wire.

4. The apparatus as defined in claim 3, further comprising:
a transmission head arranged in the region of the free end of said transmission wire.

5. The apparatus as defined in claim 1, further wherein:
said waveguide is routed to one of a horn antenna and a rod antenna.

6. The apparatus as defined in claim 1, further comprising:
a dielectric material which fills up at least the interior of said waveguide in the region of said radiating element.

7. The apparatus as defined in claim 6, further wherein:
said dielectric material comprises one of polytetrafluoroethylene (PTFE) and aluminum trioxide ($Al_2O_3$).

8. The apparatus as defined in claim 6, further wherein:
said dielectric material contains a recess into which said radiating element extends.

9. The apparatus as defined in claim 8, further wherein:
said dielectric material comprises one of polytetrafluoroethylene (PTFE) and aluminum trioxide ($Al_2O_3$).

10. An apparatus for transmitting radio-frequency signals, comprising:
  a signal generation unit;
  a radiating element;
  a signal line connecting said signal generation unit to said radiating element; and
  a waveguide defining a side wall and a back wall, wherein:
    said radiating element is a conductor structure arranged on a printed circuit board at an angle to said back wall, or to a plane parallel to said back wall; and
    said signal generation unit generates radio-frequency signals which are routed by said signal line to said radiating element.

11. The apparatus as defined in claim 10, further wherein:
said angle is greater than 4°.

12. The apparatus as defined in claim 10, further wherein:
said radiating element is a transmission wire.

13. The apparatus as defined in claim 10, further comprising:
a transmission head arranged in the region of the free end of said transmission wire.

14. The apparatus as defined in claim 10, further wherein:
said waveguide is routed to one of: a horn antenna and a rod antenna.

15. The apparatus as defined in claim 10, further comprising:
a dielectric material which fills up at least the interior of said waveguide in the region of said radiating element.

16. The apparatus as defined in claim 10, further wherein:
said dielectric material comprises one of polytetrafluoroethylene (PTFE) and aluminum trioxide ($Al_2O_3$).

17. The apparatus as defined in claim 10, further wherein:
said dielectric material contains a recess into which said radiating element extends.

18. The apparatus as defined in claim 10 further wherein:
said dielectric material comprises one of polytetrafluoroethylene (PTFE) and aluminum trioxide ($Al_2O_3$).

* * * * *